United States Patent
Wang et al.

(10) Patent No.: US 10,735,393 B2
(45) Date of Patent: Aug. 4, 2020

(54) DATA COMMUNICATION METHOD, USER EQUIPMENT, AND SERVER

(71) Applicant: Huawei Technologies Co., Ltd., Shenzhen (CN)

(72) Inventors: Fei Wang, Shenzhen (CN); Pu Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 352 days.

(21) Appl. No.: 15/603,717

(22) Filed: May 24, 2017

(65) Prior Publication Data

US 2017/0257357 A1     Sep. 7, 2017

Related U.S. Application Data

(63) Continuation of application No. PCT/CN2016/073504, filed on Feb. 4, 2016.

(30) Foreign Application Priority Data

Aug. 25, 2015     (CN) .......................... 2015 1 0528995

(51) Int. Cl.
*H04L 29/06* (2006.01)
*H04L 9/32* (2006.01)
(Continued)

(52) U.S. Cl.
CPC .............. *H04L 63/08* (2013.01); *G06F 8/63* (2013.01); *G06F 9/30076* (2013.01);
(Continued)

(58) Field of Classification Search
CPC . H04L 63/08; H04L 2209/80; H04L 63/0428; H04L 63/18; H04L 9/12;
(Continued)

(56) References Cited

U.S. PATENT DOCUMENTS

| 8,612,582 B2 * | 12/2013 | Dare ..................... H04L 63/105 726/1 |
| 9,608,809 B1 * | 3/2017 | Ghetti ..................... H04L 9/083 |

(Continued)

FOREIGN PATENT DOCUMENTS

| CN | 103455352 A | 12/2013 |
| CN | 103995748 A | 8/2014 |

(Continued)

OTHER PUBLICATIONS

C. Pahl, "Containerization and the PaaS Cloud," in IEEE Cloud Computing, vol. 2, No. 3, pp. 24-31, May-Jun. 2015. (Year: 2015).*

(Continued)

*Primary Examiner* — Jung W Kim
*Assistant Examiner* — Sameera Wickramasuriya
(74) *Attorney, Agent, or Firm* — Conley Rose, P.C.

(57) ABSTRACT

A data communication method, and a user equipment relate to the communications field and implement isolation for programs using a container technology. The user equipment includes a host machine running on a hardware layer of the user equipment, and at least one container running on the host machine, where each container corresponds to a different container instance. The user equipment determines whether an application program runs in a safe mode when a start instruction for running the application program is received, and performs security authentication with a server when the application program runs in the safe mode. The user equipment starts the application program in a container instance selected by a user when the security authentication succeeds, and performs data communication with the server using a communication channel corresponding to the selected container instance.

16 Claims, 4 Drawing Sheets

(51) Int. Cl.
- *G06F 9/455* (2018.01)
- *G06F 8/61* (2018.01)
- *G06F 9/30* (2018.01)
- *G06F 21/74* (2013.01)
- *H04L 9/12* (2006.01)
- *H04W 12/06* (2009.01)
- *G06F 9/445* (2018.01)

(52) U.S. Cl.
CPC .............. *G06F 9/455* (2013.01); *G06F 21/74* (2013.01); *H04L 9/12* (2013.01); *H04L 9/32* (2013.01); *H04L 63/0272* (2013.01); *H04L 63/0428* (2013.01); *H04L 63/18* (2013.01); *H04W 12/06* (2013.01); *G06F 9/445* (2013.01); *H04L 2209/80* (2013.01)

(58) Field of Classification Search
CPC ....... H04L 63/0272; H04L 9/32; G06F 9/455; G06F 9/30076; G06F 21/74; G06F 8/63; G06F 9/445; H04W 12/06
See application file for complete search history.

(56) References Cited

U.S. PATENT DOCUMENTS

| | | | | |
|---|---|---|---|---|
| 2007/0257104 | A1* | 11/2007 | Owen | G06F 21/32 235/380 |
| 2010/0122343 | A1* | 5/2010 | Ghosh | G06F 21/55 726/23 |
| 2010/0217853 | A1* | 8/2010 | Alexander | H04L 63/20 709/223 |
| 2010/0251002 | A1* | 9/2010 | Sivasubramanian | G06F 9/5061 714/2 |
| 2010/0262752 | A1* | 10/2010 | Davis | G06F 3/0613 711/103 |
| 2011/0314534 | A1* | 12/2011 | James | G06F 21/53 726/9 |
| 2012/0036440 | A1* | 2/2012 | Dare | G06F 9/54 715/734 |
| 2013/0227675 | A1* | 8/2013 | Fujioka | G06F 21/30 726/16 |
| 2013/0254660 | A1* | 9/2013 | Fujioka | A63F 13/12 715/707 |
| 2014/0052773 | A1 | 2/2014 | Deng et al. | |
| 2014/0109175 | A1 | 4/2014 | Barton et al. | |
| 2014/0189777 | A1* | 7/2014 | Viswanathan | H04L 63/105 726/1 |
| 2014/0282908 | A1* | 9/2014 | Ward | H04W 12/1208 726/4 |
| 2015/0142878 | A1* | 5/2015 | Hebert | H04L 67/10 709/203 |
| 2015/0200930 | A1 | 7/2015 | Linga et al. | |
| 2016/0099963 | A1* | 4/2016 | Mahaffey | G06F 8/30 717/120 |
| 2016/0170743 | A1* | 6/2016 | Shmulevich | G06F 8/30 717/120 |
| 2016/0191645 | A1* | 6/2016 | Hayton | G06F 9/445 709/203 |
| 2016/0219019 | A1* | 7/2016 | Mathur | H04L 63/0272 |
| 2016/0283198 | A1 | 9/2016 | Walker | |
| 2016/0371495 | A1* | 12/2016 | Bhat | G06F 21/53 |
| 2017/0054594 | A1* | 2/2017 | Decenzo | H04L 67/12 |
| 2017/0127145 | A1* | 5/2017 | Rajapakse | H04N 21/6125 |

FOREIGN PATENT DOCUMENTS

| | | |
|---|---|---|
| CN | 104036202 A | 9/2014 |
| CN | 104268739 A | 1/2015 |
| CN | 104854561 A | 8/2015 |
| CN | 104904178 A | 9/2015 |
| CN | 105099706 A | 11/2015 |
| EP | 2907289 B1 | 5/2018 |
| WO | 2015109593 A1 | 7/2015 |

OTHER PUBLICATIONS

D. Jaramillo, R. Smart, B. Furht and A. Agarwal, A secure extensible container for hybrid mobile applications, 2013 Proceedings of IEEE Southeastcon, Jacksonville, FL, 2013, pp. 1-5. (Year: 2013).*
Machine Translation and Abstract of Chinese Publication No. CN104036202, Sep. 10, 2014, 21 pages.
Foreign Communication From a Counterpart Application, Chinese Application No. 201510528995.3, Chinese Office Action dated Nov. 23, 2017, 8 pages.
Machine Translation and Abstract of Chinese Publication No. CN103455352, Dec. 18, 2013, 20 pages.
Machine Translation and Abstract of Chinese Publication No. CN103995748, Aug. 20, 2014, 9 pages.
Machine Translation and Abstract of Chinese Publication No. CN104268739, Jan. 7, 2015, 13 pages.
Machine Translation and Abstract of Chinese Publication No. CN105099706, Nov. 25, 2015, 20 pages.
Foreign Communication From a Counterpart Application, PCT Application No. PCT/CN2016/073504, English Translation of International Search Report dated May 24, 2016, 2 pages.
Foreign Communication From a Counterpart Application, Chinese Application No. 201510528995.3, Chinese Office Action dated Jun. 8, 2018, 8 pages.

* cited by examiner

DATA COMMUNICATION METHOD, USER EQUIPMENT, AND SERVER

CROSS-REFERENCE TO RELATED APPLICATIONS

This application is a continuation of International Patent Application No. PCT/CN2016/073504 filed on Feb. 4, 2016, which claims priority to Chinese Patent Application No. 201510528995.3 filed on Aug. 25, 2015. The disclosures of the aforementioned applications are hereby incorporated by reference in their entireties.

TECHNICAL FIELD

The present disclosure relates to the communications field, and in particular, to a data communication method, user equipment, and a server.

BACKGROUND

Bring your own device (BYOD) refers to using one's own device, for example, a mobile intelligent terminal such as a mobile phone or a tablet computer to work, that is, installing enterprise software on one's own device and setting enterprise resources to work. For an enterprise, BYOD imposes a great challenge on enterprise information security. High security becomes a primary problem to be resolved in an enterprise-level BYOD solution.

Currently, most of solutions to resolving a security problem of BYOD are to make special customization of an intelligent terminal, and make special customization of user software in order to ensure security of enterprise data. Further, BYOD can be used only when mobile informatization client software is installed on a mobile terminal. For example, a smartphone is used as a terminal carrier, and a server is deployed in the enterprise and used for interworking between a mobile phone and a computer network such that the mobile phone can interact with almost all enterprise-level services and management systems such as an office system and a financial system of the enterprise. However, such a solution requires to perform customized development or modification on user software for an enterprise, which may increase difficulty of solution implementation and increase expenditure input of the enterprise.

SUMMARY

Embodiments of the present disclosure provide a data communication method, user equipment, and a server in order to resolve a problem of high difficulty in customization development or user software reconstruction in a BYOD scenario.

According to a first aspect, a data communication method is provided, and is applied to user equipment, where the user equipment includes a hardware layer, a host machine running on the hardware layer, and at least one container running on the host machine, and each container corresponds to a different container instance, and the method includes determining, by the user equipment, whether an application program runs in a safe mode when a start instruction for running the application program is received, performing security authentication with a server if the application program runs in the safe mode, and starting, by the user equipment, the application program in a first container instance selected by a user if the security authentication succeeds, and performing data communication with the server using a dedicated communication channel corresponding to the first container instance.

With reference to the first aspect, in a first possible implementation manner of the first aspect, before the start instruction is received, the method further includes downloading and obtaining, by the user equipment, a container instance template from the server, where the container instance template is an image file of an operating system, and creating the at least one container instance using the container instance template.

With reference to the first aspect or the first possible implementation manner of the first aspect, in a second possible implementation manner of the first aspect, performing data communication with the server using a dedicated communication channel corresponding to the container instance includes performing, by the user equipment, data communication with the server using a virtual private network (VPN).

With reference to the first aspect or the first possible implementation manner or the second possible implementation manner of the first aspect, in a third possible implementation manner of the first aspect, the method further includes performing, by the user equipment using an Another UnionFS (AUFS), input/output (I/O) layer read or write on data corresponding to a container instance.

With reference to the first aspect or the first possible implementation manner to the third possible implementation manner of the first aspect, in a fourth possible implementation manner of the first aspect, the method further includes switching a window interface of a current container instance to a window interface of a container instance specified by the container instance switch request if the user equipment receives a container instance switch request.

With reference to the first aspect or any one of the first possible implementation manner to the fourth possible implementation manner of the first aspect, in a fifth possible implementation manner of the first aspect, the method further includes triggering, by the user equipment in a timer mode or an event trigger mode, obtaining of updated data of the container instance, and sending, by the user equipment, the updated data to the server such that the server synchronizes the updated data to another user equipment in different user equipments using a same account.

With reference to the first aspect or any one of the first possible implementation manner to the fifth possible implementation manner of the first aspect, in a sixth possible implementation manner of the first aspect, the method further includes receiving, by the user equipment, an erasing instruction sent by the server, and removing, by the user equipment according to a second container instance indicated by the erasing instruction, the second container instance and user data corresponding to the second container instance.

According to a second aspect, a data communication method is provided, including before an application program is started in a container instance, performing, by a server, security authentication with user equipment, and performing, by the server, data communication with the user equipment using a dedicated communication channel corresponding to a first container instance selected by a user if the security authentication succeeds.

With reference to the second aspect, in a first possible implementation manner of the second aspect, the method further includes sending, by the server to the user equipment, a container instance template that the user equipment requests to download, where the container instance template is an image file of an operating system such that the user equipment creates a container instance according to a container instance template selected by the user.

With reference to the second aspect or the first possible implementation manner of the second aspect, in a second possible implementation manner of the second aspect, performing, by the server, data communication with the user equipment using a dedicated communication channel corresponding to a first container instance selected by a user includes performing, by the server, data communication with the user equipment using a VPN corresponding to the first container instance selected by the user.

With reference to the second aspect or the first possible implementation manner or the second possible implementation manner of the second aspect, in a third possible implementation manner of the second aspect, the method further includes receiving, by the server, updated data of the first container instance sent by the user equipment, and sending, by the server, the updated data to another user equipment in different user equipments using a same account.

With reference to the second aspect or any one of the first possible implementation manner to the third possible implementation manner of the second aspect, in a fourth possible implementation manner of the second aspect, the method further includes sending, by the server, an erasing instruction to the user equipment, where the erasing instruction instructs the user equipment to remove a second container instance indicated by the erasing instruction and user data corresponding to the second container instance.

According to a third aspect, user equipment is provided, including a hardware layer, a host machine running on the hardware layer, and at least one container running on the host machine, and each container corresponds to a different container instance, and the user equipment further includes a container switch application module configured to determine whether an application program runs in a safe mode when a start instruction for running the application program is received, perform security authentication with a server if the application program runs in the safe mode, and a container management service module configured to start, by the user equipment, the application program in a first container instance selected by a user if the security authentication succeeds, and perform data communication with the server using a dedicated communication channel corresponding to the first container instance.

With reference to the third aspect, in a first possible implementation manner of the third aspect, the container switch application module is further configured to download and obtain a container instance template from the server, where the container instance template is an image file of an operating system, and create the at least one container instance using the container instance template.

With reference to the first possible implementation manner of the third aspect, in a second possible implementation manner of the third aspect, the container management service module is further configured to perform data communication with the server using a VPN, and the container management service module is further configured to perform, using an AUFS, I/O layer read or write on data corresponding to a container instance.

With reference to the second possible implementation manner of the third aspect, in a third possible implementation manner of the third aspect, the container switch application module is further configured to send an interface switch request to the container management service module if the user equipment receives a container instance switch request, and the container management service module is further configured to switch a window interface of a current container instance to a window interface of a container instance specified by the container instance switch request.

With reference to any one of the first possible implementation manner to the third possible implementation manner of the third aspect, in a fourth possible implementation manner of the third aspect, the container management service module is further configured to trigger, in a timer mode or an event trigger mode, obtaining of updated data of the container instance, and send the obtained updated data to the server such that the server synchronizes the updated data to another user equipment in different user equipments using a same account.

With reference to any one of the first possible implementation manner to the fourth possible implementation manner of the third aspect, in a fifth possible implementation manner of the third aspect, the container switch application module is further configured to receive an erasing instruction sent by the server, and send the erasing instruction to the container management service module, and the container management service module is configured to remove, according to a second container instance indicated by the erasing instruction, the second container instance and user data corresponding to the second container instance.

According to a fourth aspect, a server is provided, including a first service module configured to perform security authentication with user equipment before an application program is started in a container instance, and a second service module configured to perform data communication with the user equipment using a dedicated communication channel corresponding to a first container instance selected by a user if the security authentication succeeds.

With reference to the fourth aspect, in a first possible implementation manner of the fourth aspect, the first service module is further configured to send, to the user equipment, a container instance template that the user equipment requests to download, where the container instance template is an image file of an operating system such that the user equipment creates a container instance according to a container instance template selected by the user.

With reference to the fourth aspect or the first possible implementation manner of the fourth aspect, in a second possible implementation manner of the fourth aspect, the second service module is further configured to perform data communication with the user equipment using a VPN corresponding to the first container instance selected by the user.

With reference to the fourth aspect or the first possible implementation manner or the second possible implementation manner of the fourth aspect, in a third possible implementation manner of the fourth aspect, the second service module is further configured to receive updated data of the first container instance sent by the user equipment, and send the updated data to another user equipment in different user equipments using a same account.

With reference to the fourth aspect or any one of the first possible implementation manner to the third possible implementation manner of the fourth aspect, in a fourth possible implementation manner of the fourth aspect, the second service module is further configured to send an erasing instruction to the user equipment, where the erasing instruction instructs the user equipment to remove a second container instance indicated by the erasing instruction and user data corresponding to the second container instance.

The embodiments of the present disclosure provide a data communication method, user equipment, and a server, where the user equipment includes a hardware layer, a host machine running on the hardware layer, and at least one container running on the host machine, and each container corresponds to a different container instance. The user equipment determines whether an application program runs in a safe mode when a start instruction for running the application program is received, performs security authentication with a server if the application program runs in the safe mode. The user equipment starts the application program in a first container instance selected by a user if the security authentication succeeds, and performs data communication with the server using a dedicated communication channel corresponding to the first container instance. In this way, for BYOD, on the basis that the application is not modified, it may be implemented using a container technology that the application runs in a security isolation environment of a handheld device, and security of enterprise data is ensured using the dedicated communication channel, which can resolve a problem of high difficulty in customization development or user software reconstruction in a BYOD scenario.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

A container can provide isolated running space for an application program, which can implement that multiple virtual machines whose running environments are isolated run on a same host machine (a host on which a virtual device such as a virtual machine or a container is installed). Each container includes exclusive complete user environment space, and a change in a container does not affect a running environment of another container. To implement such an effect, a container technology uses a series of system-level mechanisms such as LINUX namespaces for space isolation. A mount point of a file system is used in order to determine which files can be accessed by a container, and cgroups (a mechanism provided by a LINUX kernel and can limit, record, and isolate a physical resource used by a process group) is used in order to determine how many resources can be used by each container. In addition, a same system kernel is shared among containers. In this way, utilization efficiency of a memory is improved when a same library is used by multiple containers.

Figure 1:
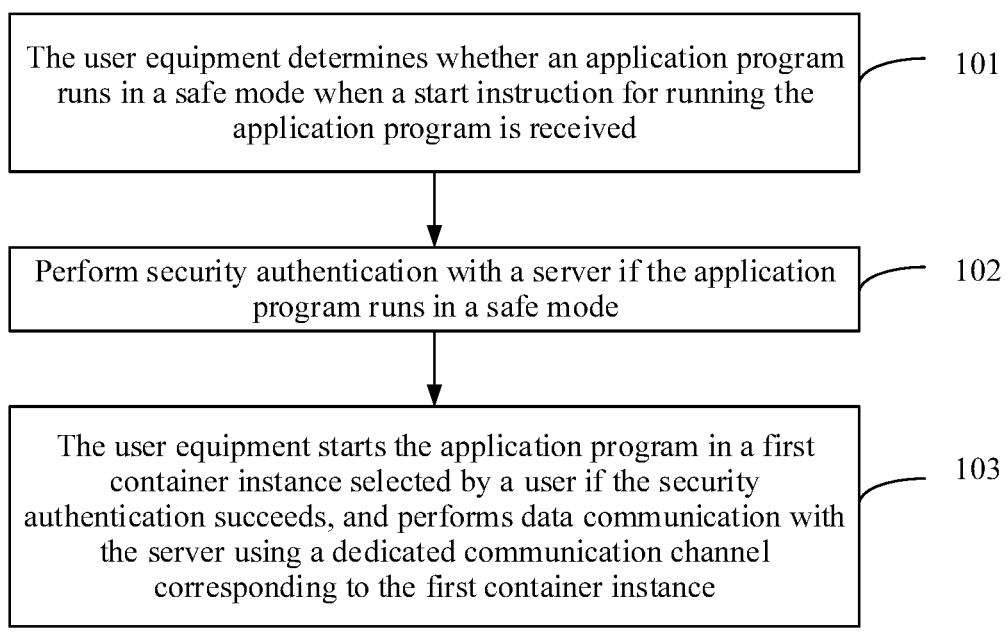
FIG. 1 is a schematic flowchart of a data communication method according to an embodiment of the present disclosure.

To resolve a problem of high difficulty in customization development or user software reconstruction in a BYOD scenario, an embodiment of the present disclosure provides a data communication method, applied to user equipment, where the user equipment includes a hardware layer, a host machine running on the hardware layer, and at least one container running on the host machine, the host machine has several container instances, and each container corresponds to a different container instance. As shown in FIG. 1, the method includes the following steps.

Step 101: The user equipment determines whether an application program runs in a safe mode when a start instruction for running the application program is received.

The user equipment herein is a mobile device on which a container instance template is installed, such as a mobile phone and a tablet computer. The container instance template is an image file of an operating system, and is a source program for running a container instance. The container instance can provide a running environment for an application program, and share a kernel program with a host machine, but has user mode process space of the container instance. A container established on a host machine corresponds to a container instance.

The container instance template may be in various types such as a type used for office or a type used for entertainment. One user equipment may have multiple container instance templates of different types. For one container instance template, a container instance may be separately created on different user equipments. For example, container instances used for financial work, and research and development work are created an office-type container instance template.

If a container instance template is installed on user equipment, when a user needs to run an application, the user may choose, on a user interface (UI) in order to run the application program in a safe mode, such as in a container instance, or run the application program on an original host machine. Therefore, the user equipment needs to determine, according to an instruction from the user, whether the application program runs in a safe mode.

Step 102: Perform security authentication with a server if the application program runs in a safe mode.

Security authentication with the server needs to be performed first if the user chooses to run the application program in a secure environment. For example, the user enters a user name and a password, and the server determines whether the security authentication succeeds such that only internal staff of an enterprise have permission to communicate with the server in the safe mode.

Step 103: The user equipment starts the application program in a first container instance selected by a user if the security authentication succeeds, and performs data communication with the server using a dedicated communication channel corresponding to the first container instance.

Multiple container instances selectable to the user may be displayed on the UI if the security authentication succeeds. For example, a user may select a container used for financial work to run an application program if the application program released by an enterprise used for financial work is installed on user equipment, and perform data communication with an enterprise server. The user equipment performs data communication with the server using the dedicated communication channel corresponding to the first container instance selected by the user, which can ensure security of data communication. In this way, an application program runs in a security isolation environment using a container technology and a dedicated communication channel, which also ensures security of data communication.

This embodiment of the present disclosure provides a data communication method, applied to user equipment, where the user equipment includes a hardware layer, a host machine running on the hardware layer, and at least one container running on the host machine, the host machine has several container instances, and each container instance separately corresponds to a different container. The user equipment determines whether an application program runs in a safe mode when a start instruction for running the application program is received, and performs security authentication with a server if the application program runs in the safe mode. The user equipment starts the application program in a first container instance selected by a user if the security authentication succeeds, and performs data communication with the server using a dedicated communication channel corresponding to the first container instance. In this way, for BYOD, on the basis that the application is not modified, it may be implemented using a container technology that the application runs in a security isolation environment of a handheld device, and security of enterprise data is ensured using the dedicated communication channel, which can resolve a problem of high difficulty in customization development or user software reconstruction in a BYOD scenario.

Figure 2:
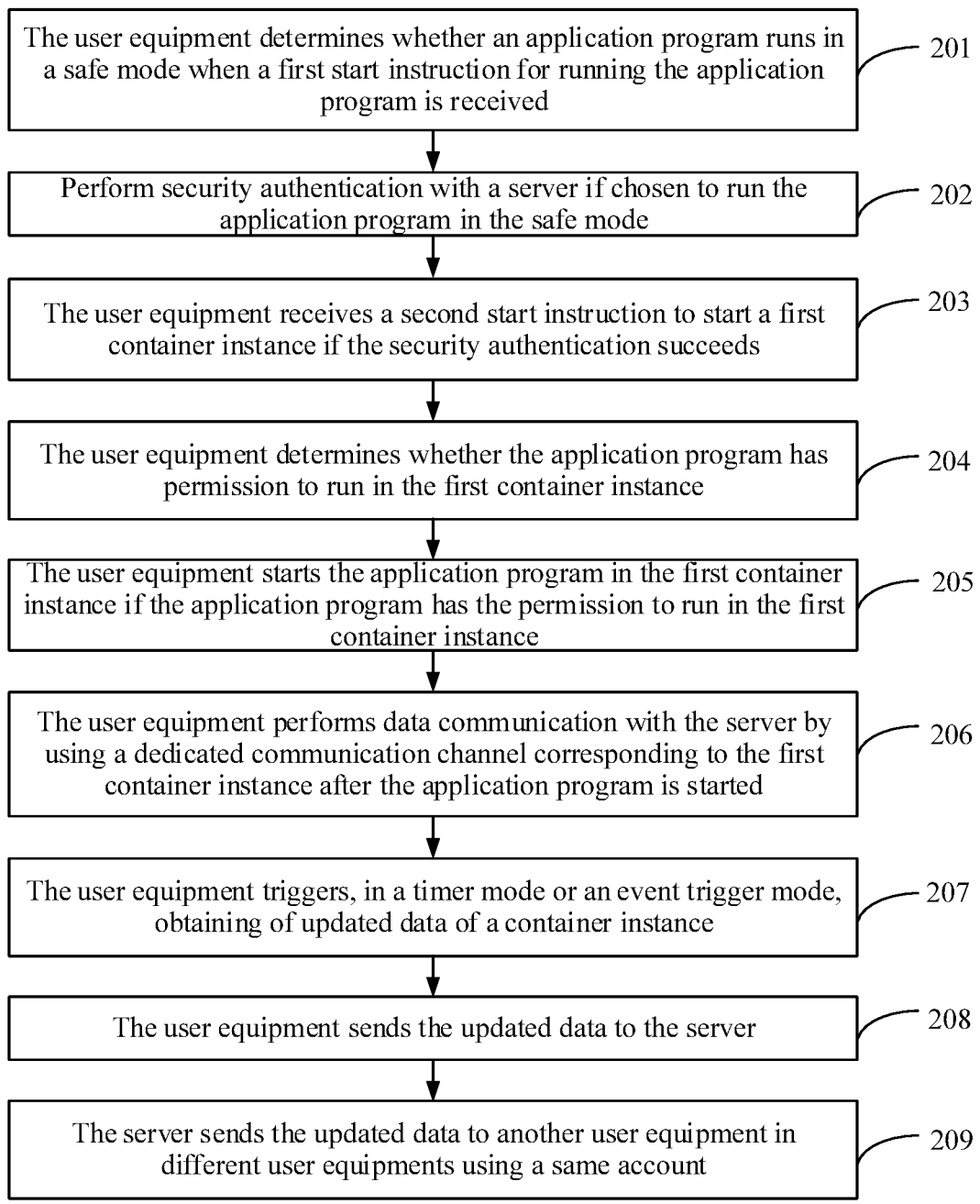
FIG. 2 is a schematic flowchart of a data communication method according to an embodiment of the present disclosure.

Another embodiment of the present disclosure provides a data communication method, applied to user equipment, where the user equipment includes a hardware layer, a host machine running on the hardware layer, and at least one container running on the host machine, the host machine has several container instances, and each container instance separately corresponds to a different container. As shown in FIG. 2, the method includes the following steps.

Step 201: The user equipment determines whether an application program runs in a safe mode when a first start instruction for running the application program is received.

Before the user equipment receives the first start instruction, a container instance template is already installed on the user equipment. The container instance template may be created after the host machine starts, for example, user equipment downloads and obtains a container instance template from a server, and creates at least one container instance using the container instance template, or may be embedded in the host machine when the host machine is released, where it is not required to request to download the container instance template from the server.

A user may choose whether to run an application program in a safe mode, that is, in a container instance if a container instance template exists in the user equipment, and when the user equipment needs to start the application.

Step 202: Perform security authentication with a server if chosen to run the application program in the safe mode.

For example, the user is required to enter authentication information such that the server determines whether the user has permission to run the application program in a secure environment.

Step 203: The user equipment receives a second start instruction to start a first container instance if the security authentication succeeds.

Multiple container instances selectable to the user may be displayed on a UI of the user equipment if the security authentication succeeds such that the user selects one of the container instances to run the application program.

Step 204: The user equipment determines whether the application program has permission to run in the first container instance.

During a start process of a first container instance selected by the user, a VPN may be created by the first container instance, where creation of the VPN may be implemented by creating a virtual network interface card and a corresponding driver, or creation of the VPN may be implemented in another manner, which is not limited in this application. Then, after creation of a VPN module is completed, authentication information entered by the user in a current container is sent to the server using the VPN module such that a service module on a server side determines whether the authentication succeeds, where the authentication information may be a user name and a password, or specified authentication information. A VPN link is successfully established between the server and a container instance if the server determines that the authentication succeeds, and the server can provide various network services to the container instance based on the VPN link. Subsequently, a network service needs to be forwarded using the VPN module if an application program in the container needs to obtain the network service.

Step 205: The user equipment starts the application program in the first container instance if the application program has permission to run in the first container instance.

Step 206: The user equipment performs data communication with the server using a dedicated communication channel corresponding to the first container instance after the application program is started.

The user equipment may perform data communication with the server using the VPN, that is, if an application in a container needs to obtain a network service, the network service may be forwarded using the VPN. Because the VPN can establish, using a special encrypted communications protocol, a dedicated communications line between two or more intranets located at different places and connected to the network, in this way, reliability for connecting users and security and confidentiality for transmitting data can be ensured using security technologies, such as encryption and identity verification such as the VPN. Therefore, security of communication between the application program in the container and the server side can be ensured. A network policy of the container instance, for example, whether a copy function is enabled, and a network address forbidden to be accessed, may be controlled by a policy of the VPN, or may be controlled by a network policy corresponding to the server. The network policy of the VPN may also be delivered using a policy of the server.

In addition, the user equipment may perform, using an AUFS, I/O layer read or write on data corresponding to the container instance. The AUFS is a reconstructed AUFS, and responsible for local read and write of data in the current container, and provides support of file system-level encrypted read and write for file read and write of the application program in the container. The AUFS may store, to a local disk using an encryption component, data read and written by the application program. In this way, the application program can access only a resource owned by the container instance when the application program runs in process space of a container, which ensures security of internal data in the container. Isolation of read and written content may be implemented between different containers, and security isolation of content may also be implemented between the container and the server. In this way, an application program outside the container cannot access encrypted disk data, and different containers cannot access data generated by other containers. Data corresponding to a container instance may be written to a local cache, which can ensure continuity of running an application program in the container instance. For example, if a network is suddenly disconnected when an application program runs in a container instance, the application program can continue to run normally according to locally cached data when the locally cached data can make the application program reconnect to the network.

In this way, the encryption component in the container instance is used in order to read and write disk data, and only a virtual disk provided by the AUFS can be operated. Even an application program not internally released by an enterprise can run in the container, which more flexibly and conveniently meets an office requirement of a user. Once an application program runs in process space of a container, the application program can access only a resource owned by the container, which ensures security of internal data in the container, and meanwhile can use more application programs.

The application program may be a local application program in the user equipment, or may be obtained by downloading from the server after the container instance is started, or obtained by downloading using a third network service, which is not limited in this application.

Step 207: The user equipment triggers, in a timer mode or an event trigger mode, obtaining of updated data of the container instance.

After data read and written by an application program in a container is written to local storage using the encryption component, data synchronization with the server may be implemented.

A policy of the data synchronization may use a timer mode, or may use an event trigger mode. The timer mode is that a synchronization component actively initiates a synchronization request at an interval, or the server side actively initiates a synchronization request at an interval. The event trigger mode indicates that a synchronization request is initiated upon a user event, or by an application program or an administrator on the server side. The user equipment is triggered using the synchronization request to obtain local updated data that is the latest and is of the container instance.

Step 208: The user equipment sends the updated data to the server.

Further, for same user equipment, different container instances may be used on a same device, to access different data centers or different enterprises or departments of a same data center. Likewise, container instances of a same configuration may be used on different devices. In this way, the user equipment can send updated data in container instances using a same account to a server.

Exemplarily, for example, during a process in which an application program in a container instance communicates with a server, the container instance may regularly receive a synchronization request sent by the server. Then, user equipment may send, to the server, data is locally cached from a previous time when the container instance received a synchronization request to a current time when the container instance receives a synchronization request.

Step 209: The server sends the updated data to another user equipment in different user equipments using a same account.

In this way, the container instance and the server can perform synchronization, and synchronization of same container instances on different user equipments may be implemented in order to achieve synchronization of same container instances between different user equipments. In this way, a same account may be used in different devices to log in to same container instances for indiscriminate work.

Exemplarily, when an application program runs in a container instance and the container instance communicates with a server, the server may be notified, when the container instance and the server establish a connection, of a unique identifier of user equipment in which the container instance is located. In this way, after the server and the container instance establish the connection, an account for the container instance to log in to the server and the unique identifier of the user equipment are accordingly stored in the server. When multiple user equipments use the account of the container instance to log in to the server, the server records unique identifiers of the multiple user equipments using the same account. Therefore, when the server saves updated data of a container instance sent by any user equipment using the account, if a login request of a container instance sent by another user equipment is received, the server sends the updated data to another user equipment such that the updated data can be synchronized to the other user equipment in different user equipments using a same account.

In addition, if a user needs to switch a container instance interface, when user equipment receives a container instance switch request, a window interface of a current container instance is switched to a window interface of a container instance specified by the container instance switch request. Exemplarily, a Z order value of a switched-to container instance and an initial window interface may be first obtained according to an identifier of the switched-to container instance, and then window display on the user equipment is completed according to the Z order value and the initial window interface. For example, FrameBuffer content of a current user equipment is refreshed as a window interface of a specified container instance using a SurfaceFlinger module. Certainly, a host machine interface may also be switched to a container interface according to this method.

The server side may send an erasing instruction to the user equipment if the server side needs to remove a container instance, and after obtaining the erasing instruction, a container management service module may remove a second container instance indicated by the erasing instruction and user data corresponding to the second container instance.

Exemplarily, when user equipment is lost, a user wants to prevent data in a container instance in the user equipment from being leaked, the container instance and corresponding locally cached data can be removed by sending an erasing instruction by a server to the user equipment in order to implement remote erasure of the container instance and corresponding cached data in a case in which a device is lost.

This embodiment of the present disclosure provides a data communication method, applied to user equipment, where the user equipment includes a hardware layer, a host machine running on the hardware layer, and at least one container running on the host machine, the host machine has several container instances, and each container instance separately corresponds to a different container. The user equipment determines whether an application program runs in a safe mode when a start instruction for running the application program is received, and performs security authentication with a server if the application program runs in the safe mode. The user equipment starts the application program in a first container instance selected by a user if the security authentication succeeds, and performs data communication with the server using a dedicated communication channel corresponding to the first container instance. In this way, for BYOD, on the basis that the application is not modified, it may be implemented using a container technology that the application runs in a security isolation environment of a handheld device, and security of enterprise data is ensured using the dedicated communication channel, which can resolve a problem of high difficulty in customization development or user software reconstruction in a BYOD scenario.

Figure 3:
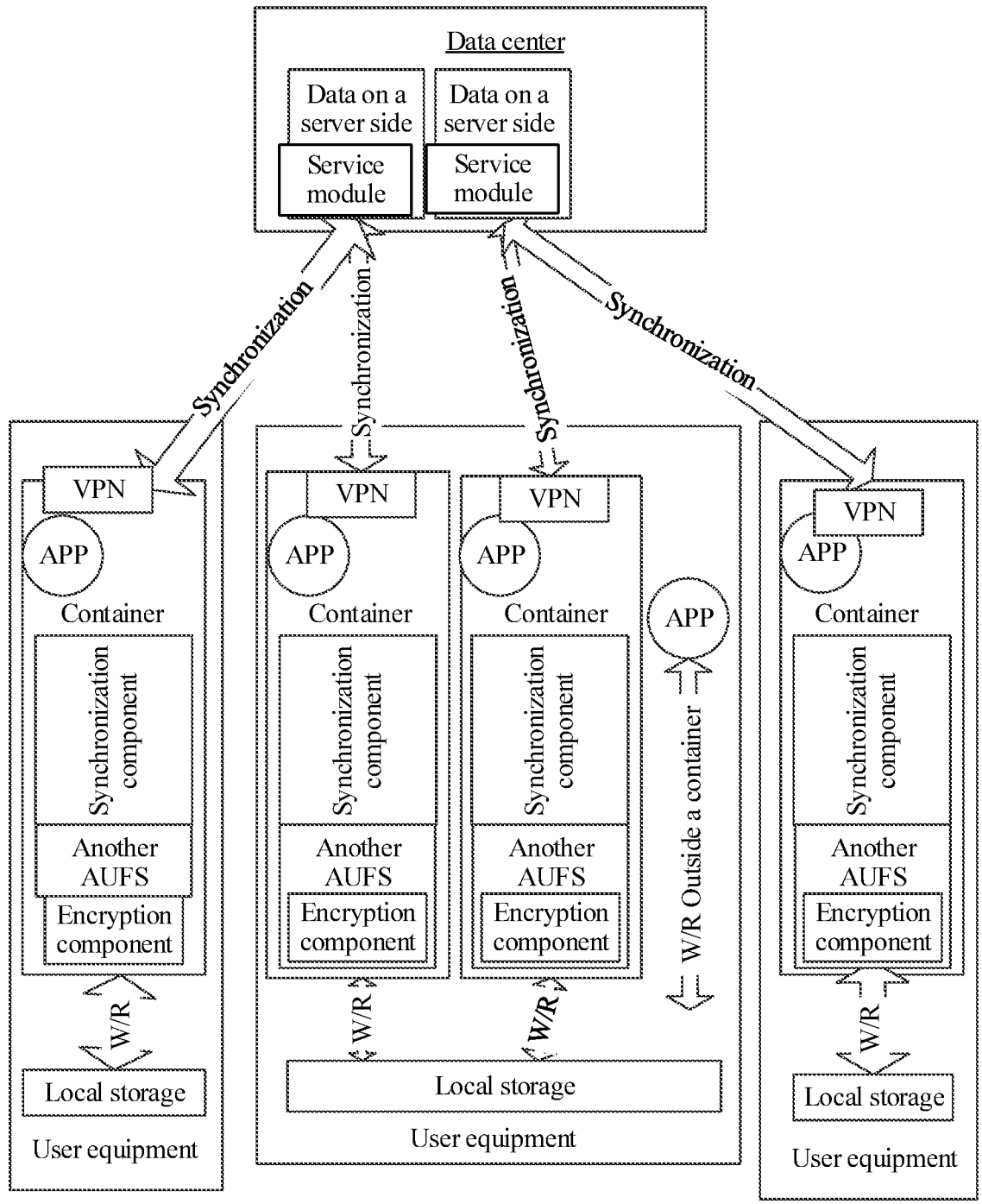
FIG. 3 is a schematic structural diagram of container-based typical BYOD deployment according to an embodiment of the present disclosure.

Using the foregoing container technology, an embodiment of the present disclosure provides a container-based BYOD platform. As shown in FIG. 3, FIG. 3 is a structural diagram of container-based typical BYOD deployment and a schematic internal logic diagram. FIG. 3 shows a deployment structure of three user equipments, for example handheld devices, such as a mobile phone and a tablet computer and a data center, such as a server, which provides services for access of the user equipments, delivers an instruction, and so on and components in the devices.

Main components included in the data center include server side data, that is, a backup of a container instance template and a container instance to a server side, where the container instance template is a source program for running of a container and is an image file of an operating system, and the container instance provides a running environment for running of an application program in the container, and a service module, which can provide a capability to communicate with the user equipment, such as an ANDROID device, and provide services for access of the user equipment, and a related instruction delivery function, that is, provide the user equipment with a corresponding network service, such as VPN policy control, a data synchronization service, and centralized authentication.

Main components included in the user equipment include a local storage, such as a host machine, which is a storage module or a built-in disk on the user equipment, and stores data written by the host machine or a container instance, a container, such as a container instance running on the host machine, where the container instance provides a running environment for an application in the container, a VPN, which is a dedicated network module in the container and is responsible for interaction with the data center, a synchronization component, which is a module responsible for data synchronization between the container and the data center, where the module belongs to a corresponding container, that is, one container corresponds to one synchronization component, an AUFS, which is a reconstructed AUFS responsible for local read and write of data (designated as W/R in the FIG. 3) in a current container, and provides support of file system-level encrypted read and write for file read and write of the application program in the container, an encryption component used by an encrypted AUFS module, and responsible for encrypted read and write, and an application program (designated as APP in the FIG. 3) installed on the host machine or is in the container.

The foregoing components are all stored in the application program in the storage in a form of software.

Based on the foregoing components in the device, an embodiment of the present disclosure provides a module design configured to invoke, in user equipment, components in the user equipment to execute the foregoing method steps, where the module may be understood as an upper-level management application program configured to manage the components in the user equipment, and includes a container switch application module, which is installed on the host machine, is an upper-level application program responsible for container management, and provides a user with an interactable UI, a container management service module, which provides a container management service installed on the host machine, and responsible for managing life cycles of all containers on the current host machine, including start of each container, process management, and the like, a container driving module (optional), which is a driving module configured to perform communication between the container management service module and each container, a window management service component, which is responsible for switching between a window program on the host machine and a container window program, a SurfaceFlinger, which is a component module responsible for drawing, and a frame buffer (FrameBuffer), which is a universal drawing system, and configured to store a final rendering result.

Figure 4:
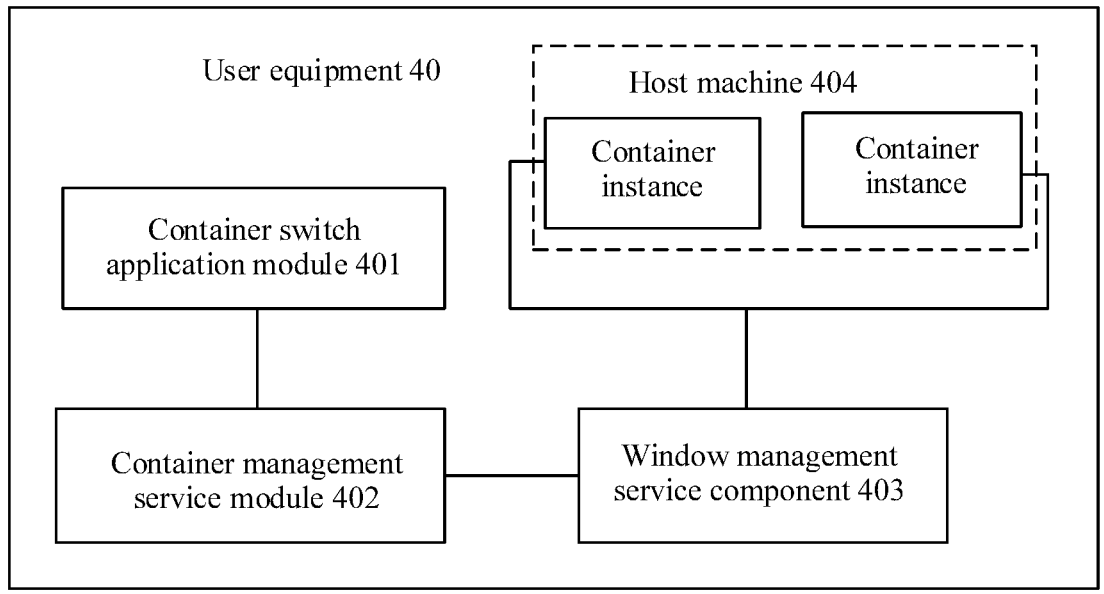
FIG. 4 is a schematic structural diagram of user equipment according to an embodiment of the present disclosure.

Therefore, using the foregoing components and management application programs, an embodiment of the present disclosure provides user equipment 40 in FIG. 4, including a hardware layer (not shown), a host machine 404 running on the hardware layer, and at least one container running (not shown) on the host machine, the host machine has several container instances, and each container instance separately corresponds to a different container. As shown in FIG. 4, the user equipment 40 further includes a container switch application module 401 configured to determine whether an application program runs in a safe mode when a start instruction for running the application program is received, and perform security authentication with a server if the application program runs in the safe mode, and a container management service module 402 configured to start, by the user equipment 40, the application program in a first container instance selected by a user if the security authentication succeeds, and perform data communication with the server using a dedicated communication channel corresponding to the first container instance.

Further, the container management service module 402 may query all container instances in the current user equipment 40 that are selectable to the user. The dedicated communication channel herein may be the foregoing VPN, and certainly, may be in another manner, which is not limited in this application.

Optionally, the container switch application module 401 may be further configured to download and obtain a container instance template from the server, where the container instance template is an image file of an operating system, and create at least one container instance using the container instance template.

Further, the container switch application module 401 may request to download the container instance template from the server, and an instruction to create a container instance is sent to the container management service module 402 after the instance template is downloaded. The at least one container instance is created by the container management service module 402 according to the container instance template.

Optionally, the container management service module 402 may be further configured to perform data communication with the server using a VPN, and perform, using an AUFS, I/O layer read or write on data corresponding to the container instance.

During a container start process, a VPN corresponding to the container instance is also first created, which is implemented using, for example, a virtual network interface card and a corresponding driver. Then a login user name and a password of a current container instance or specified authentication information authenticates whether an application program can run in the container instance. The application program is run in a native device environment if the application program cannot run in the container instance.

In addition, when disk data is read and written, the read and write may be performed using an encryption component in a container instance, and only a virtual disk provided by the AUFS is operated, which can improve security of data corresponding to different container instances.

Communication between the container management service module 402 and a container instance may be implemented by a container driving module (not shown) installed on the host machine 404.

Optionally, the container switch application module 401 is further configured to send an interface switch request to the container management service module 402 if the user equipment receives a container instance switch request.

The container management service module 402 is configured to switch a window interface of the current container instance to a window interface of a container instance specified by the container instance switch request.

Exemplarily, the container management service module 402 is further configured to obtain a Z order value of a switched-to container instance and an initial window interface according to an identifier of the switched-to container instance, and send the Z order value and the initial window interface to a window management service component 403.

The window management service component 403 is configured to complete, according to the Z order value and the initial window interface, window display on a display module (not shown) of the user equipment 40. That is, FrameBuffer content of the current user equipment 40 is refreshed as a specified container instance window interface (not shown) using a SurfaceFlinger module (not shown). Certainly, it may also be that a host machine interface (not shown) is switched to a container interface.

Optionally, the container management service module 402 is further configured to trigger, in a timer mode or an event trigger mode, obtaining of updated data of the container instance, and send the obtained updated data to a server such that the server synchronizes the updated data to another user equipment in different user equipments using a same account.

In this way, the container instance and the server can perform synchronization, and synchronization of same container instances on different user equipments may be implemented in order to achieve synchronization of same container instances between different user equipments. In this way, a same account may be used in different devices to log in to same container instances for indiscriminate work.

Optionally, the container switch application module 401 is further configured to receive an erasing instruction sent by the server, and send the erasing instruction to the container management service module 402.

The container management service module 402 is configured to remove, according to a second container instance indicated by the erasing instruction, the second container instance and user data corresponding to the second container instance, and notify the window management service component 403 such that the window management service component 403 adjusts the Z order value, and the like.

This embodiment of the present disclosure provides user equipment 40, including a hardware layer, a host machine 404 running on the hardware layer, and at least one container running on the host machine 404, the host machine 404 has several container instances, and each container instance separately corresponds to a different container. The user equipment 40 further includes a container switch application module 401 configured to determine whether an application program runs in a safe mode when a start instruction for running the application program is received, and perform security authentication with a server if the application program runs in the safe mode, a container management service module 402 configured to start, by the user equipment, the application program in a first container instance selected by a user if the security authentication succeeds, and perform data communication with the server using a dedicated communication channel corresponding to the first container instance. In this way, for BYOD, on the basis that the application is not modified, it may be implemented using a container technology that the application runs in a security isolation environment of a handheld device, and security of enterprise data is ensured using the dedicated communication channel, which can resolve a problem of high difficulty in customization development or user software reconstruction in a BYOD scenario.

Figure 5:
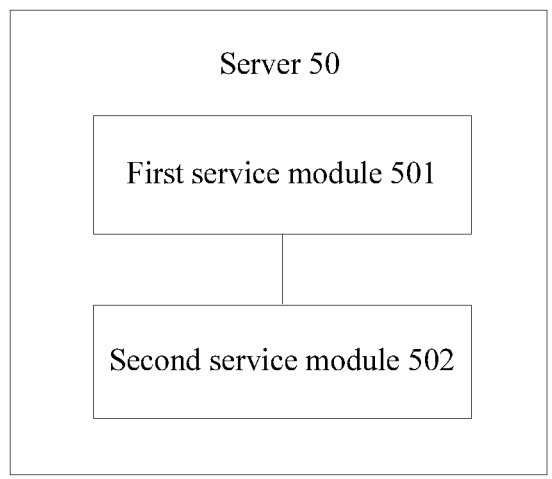
FIG. 5 is a schematic structural diagram of a server according to an embodiment of the present disclosure.

An embodiment of the present disclosure further provides a server 50, as shown in FIG. 5, including a first service module 501 configured to perform security authentication with user equipment before an application program is started in a container instance, and a second service module 502 configured to perform data communication with the user equipment using a dedicated communication channel corresponding to a first container instance selected by a user if the security authentication succeeds.

Optionally, the first service module 501 is further configured to send, to the user equipment, a container instance template that the user equipment requests to download, where the container instance template is an image file of an operating system such that the user equipment creates a container instance according to a container instance template selected by the user.

Optionally, the second service module 502 is further configured to perform data communication with the user equipment using a VPN corresponding to the first container instance selected by the user.

Optionally, the second service module 502 is further configured to receive updated data of the first container instance sent by the user equipment, and send the updated data to another user equipment in different user equipments using a same account.

Optionally, the second service module 502 is further configured to send an erasing instruction to the user equipment, where the erasing instruction instructs the user equipment to remove a second container instance indicated by the erasing instruction and user data corresponding to the second container instance.

This embodiment of the present disclosure provides a server 50, including a first service module 501 configured to perform security authentication with user equipment before an application program is started in a container instance, and a second service module 502 configured to perform data communication with the user equipment using a dedicated communication channel corresponding to a first container instance selected by a user if the security authentication succeeds. In this way, for BYOD, on the basis that the application is not modified, it may be implemented using a container technology that the application runs in a security isolation environment of a handheld device, and security of enterprise data can be ensured using the dedicated communication channel, which can resolve a problem of high difficulty in customization development or user software reconstruction in a BYOD scenario.

In the several embodiments provided in the present application, it should be understood that the disclosed terminal and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The integrated unit may be stored in a computer-readable storage medium when the foregoing integrated unit is implemented in a form of a software functional unit. The software functional unit is stored in a storage medium and includes several instructions for instructing a computer device, which may be a personal computer, a server, or a network device to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data communication method implemented by a first user equipment, the data communication method comprising:
   receiving a start instruction for running an application program;
   determining, in response to the start instruction, whether the application program runs in a safe mode;
   performing security authentication with a server when the application program runs in the safe mode;
   starting the application program in a first container instance selected by a user when the security authentication succeeds;
   performing data communication with the server using a dedicated communication channel corresponding to the first container instance when the security authentication succeeds;
   obtaining, in a timer mode or an event trigger mode, updated data of the application program in the first container instance with an account; and
   sending the updated data to the server for the server to synchronize the updated data to another container instance with the same account running in a second user equipment.

2. The data communication method of claim 1, wherein before receiving the start instruction, the data communication method further comprises:
   downloading a container instance template from the server, wherein the container instance template is an image file of an operating system; and
   creating at least one container instance using the container instance template.

3. The data communication method of claim 1, further comprising further performing the data communication with the server using a virtual private network (VPN).

4. The data communication method of claim 1, further comprising:
   receiving an erasing instruction from the server; and
   removing, according to a second container instance indicated by the erasing instruction, the second container instance and user data corresponding to the second container instance.

5. A data communication method implemented by a server, the data communication method comprising:
   performing security authentication with a first user equipment before an application program is started in a first container instance in the first user equipment;
   performing data communication with the first user equipment using a dedicated communication channel corresponding to the first container instance when the security authentication succeeds;
   receiving, from the first user equipment, updated data of the application program in the first container instance with an account; and
   sending the updated data to a second user equipment in order to use the updated data to update another container instance with the same account running in the second user equipment.

6. The data communication method of claim 5, further comprising:
   receiving, from the first user equipment, a request to download a container instance template, wherein the container instance template is an image file of an operating system that permits the first user equipment to create a container instance using the container instance template; and
   sending the container instance template to the first user equipment.

7. The data communication method of claim 5, further comprising further performing the data communication with the first user equipment using a virtual private network (VPN) corresponding to the first container instance.

8. The data communication method according to claim 5, further comprising sending, to the first user equipment, an erasing instruction instructing the first user equipment to remove a second container instance and user data corresponding to the second container instance.

9. A computer program product comprising computer-executable instructions stored on a non-transitory computer-readable medium that, when executed by a processor, cause a first user equipment to:
   receive a start instruction for running an application program;
   determine, in response to the start instruction, whether the application program runs in a safe mode;
   perform security authentication with a server when the application program runs in the safe mode;
   start the application program in a first container instance selected by a user when the security authentication succeeds;

perform data communication with the server using a dedicated communication channel corresponding to the first container instance when the security authentication succeeds;

obtain, in a timer mode or an event trigger mode, updated data of the application program in the first container instance with an account; and send the updated data to the server for the server to synchronize the updated data to another container instance with the same account running in a second user equipment.

10. The computer program product of claim 9, wherein the instructions further cause the first user equipment to:

download a container instance template from the server, wherein the container instance template is an image file of an operating system; and create at least one container instance using the container instance template before the start instruction is received.

11. The computer program product of claim 9, wherein the instructions further cause the first user equipment to further perform the data communication with the server using a virtual private network (VPN).

12. The computer program product of claim 9, wherein the instructions further cause the first user equipment to:

receive an erasing instruction from the server; and remove, according to a second container instance indicated by the erasing instruction, the second container instance and user data corresponding to the second container instance.

13. A computer program product comprising computer-executable instructions stored on a non-transitory computer-readable medium that, when executed by a processor, cause a server to:

perform security authentication with a first user equipment before an application program is started in a first container instance in the first user equipment;

perform data communication with the first user equipment using a dedicated communication channel corresponding to the first container instance when the security authentication succeeds;

receive, from the first user equipment, updated data of the application program in the first container instance with an account; and send the updated data to a second user equipment in order to use the updated data to update another container instance with the same account running in the second user equipment.

14. The computer program product of claim 13, wherein the instructions further cause the server to:

receive, from the first user equipment, a request to download a container instance template, wherein the container instance template is an image file of an operating system that permits the first user equipment to create a container instance using the container instance template; and send the container instance template to the first user equipment.

15. The computer program product of claim 13, wherein the instructions further cause the server to further perform the data communication with the first user equipment using a virtual private network (VPN) corresponding to the first container instance.

16. The computer program product of claim 13, wherein the instructions further cause the server to send, to the first user equipment, an erasing instruction instructing the first user equipment to remove a second container instance and user data corresponding to the second container instance.

* * * * *